United States Patent [19]

Cahill, III

[11] Patent Number: 5,953,065
[45] Date of Patent: Sep. 14, 1999

[54] METHOD AND APPARATUS FOR COMMON VERTICAL BLANKING INTERVAL SCAN LINE DECODING

[75] Inventor: Benjamin M. Cahill, III, Ringoes, N.J.

[73] Assignee: Intel Corporation, Santa Clara, Calif.

[21] Appl. No.: 08/670,568

[22] Filed: Jun. 26, 1996

[51] Int. Cl.[6] .............................. H04N 7/00; H04N 11/00
[52] U.S. Cl. ........................ 348/478; 348/460; 348/468
[58] Field of Search .................................. 348/460, 461, 348/465, 466, 467, 468, 470, 478; H04N 7/00, 11/00

[56] References Cited

U.S. PATENT DOCUMENTS

| | | |
|---|---|---|
| Re. 34,810 | 12/1994 | Lemaine et al. . |
| 4,502,077 | 2/1985 | Morotomi et al. . |
| 4,600,943 | 7/1986 | Tanabe ................................... 348/468 |
| 4,658,294 | 4/1987 | Park . |
| 4,667,235 | 5/1987 | Nozoe et al. . |
| 4,774,715 | 9/1988 | Messenger . |
| 5,089,892 | 2/1992 | Koguchi et al. . |
| 5,293,234 | 3/1994 | Ko . |
| 5,311,311 | 5/1994 | Harigai et al. . |
| 5,311,312 | 5/1994 | Oh . |
| 5,371,545 | 12/1994 | Tults . |
| 5,483,289 | 1/1996 | Urade et al. ............................ 348/468 |
| 5,486,865 | 1/1996 | James ..................................... 348/468 |
| 5,491,518 | 2/1996 | Kim . |
| 5,506,626 | 4/1996 | Yagi et al. .............................. 348/478 |
| 5,512,954 | 4/1996 | Shintani ................................. 348/468 |
| 5,517,249 | 5/1996 | Rodriguez-Cavazos et al. . |
| 5,521,645 | 5/1996 | Ezaki . |
| 5,537,151 | 7/1996 | Orr et al. . |
| 5,552,726 | 9/1996 | Wichman et al. . |
| 5,555,024 | 9/1996 | Limberg . |
| 5,555,025 | 9/1996 | McArthur . |
| 5,559,560 | 9/1996 | Lee ......................................... 348/468 |
| 5,561,469 | 10/1996 | Schultz . |
| 5,565,930 | 10/1996 | Bolger et al. . |
| 5,589,886 | 12/1996 | Ezaki ..................................... 348/468 |
| 5,590,154 | 12/1996 | Forni et al. . |
| 5,654,765 | 8/1997 | Kim . |
| 5,657,088 | 8/1997 | Hankinson ............................. 348/465 |

FOREIGN PATENT DOCUMENTS

| | | |
|---|---|---|
| 0 516 216 A2 | 12/1992 | European Pat. Off. . |
| 0 552 577 A1 | 7/1993 | European Pat. Off. . |
| 0 617 551 A1 | 9/1994 | European Pat. Off. . |
| 4-227378 | 8/1992 | Japan . |
| 08317254 | 11/1996 | Japan . |
| WO 94/27400 | 11/1994 | WIPO . |

OTHER PUBLICATIONS

*PCT International Search Report* for International Application No. PCT/US97/09759, dated Sep. 04, 1997, 1 page.

Joint EIA/CVCC Recommended Practice for Teletext: North American Basic Teletext Specification (NABTS), EIA STANDARD: EIA—516, May 1988, Pages: Cover, Preface, i–vi, 1–5, and 62–65.

"Recommended Practice for Line 21 Data Service", EIA Standard: EIA—608, Sep. 1994, Pages: Cover, i–iv, and 7–9.

*PCT International Search Report* for International Application No. PCT/US97/10360 (Docket No. 42390.P3734), dated Oct. 09, 1997, 1 page.

*PCT International Search Report* for International Application No. PCT/US97/10362 (Docket No. 42390.P3733), dated Oct. 17, 1997, 1 page.

*Primary Examiner*—Nathan Flynn
*Assistant Examiner*—Vivek Srivastava
*Attorney, Agent, or Firm*—Blakely, Sokoloff, Taylor & Zafman LLP

[57] ABSTRACT

A hardware system is programmed with a common vertical blanking interval (VBI) scan line decoder to support capture hardware of multiple vendors. The common decoder includes a first and a second function for a capture driver associated with a capture hardware to describe to the common decoder, the sample rate and the line pitch employed by the capture hardware respectively. The common decoder further includes additional functions for the capture driver to confirm the common decoder's presence, register a call back function, specify a channel, and request decoding for a field.

42 Claims, 6 Drawing Sheets

METHOD AND APPARATUS FOR COMMON VERTICAL BLANKING INTERVAL SCAN LINE DECODING

BACKGROUND OF THE INVENTION

1. Field of the Invention

The present invention relates to the field of television signal processing. More specifically, the present invention relates to the capturing and decoding of vertical blanking interval (VBI) scan lines.

2. Background Information

Broadcasting of closed captions, teletext, etc. in the vertical blank intervals of television signals is known in the art. Conventionally, capturing and decoding of VBI scan lines are typically performed by hardware. While the prior art hardware approach offers the opportunity to tightly integrate the two operations, the approach has at least the following disadvantages:

a) it is inefficient for each hardware vendor to have to develop its own decoding solution; and b) it is difficult to mix and match different capture and decoding implementations.

Thus, it is desirable if a common decoding solution can be offered for capture hardware of multiple vendors.

SUMMARY OF THE INVENTION

A computer system is programmed with a common VBI scan line decoder to support capture hardware of multiple vendors. The common decoder includes a first and a second function for a capture driver associated with a capture hardware to describe to the common decoder, the sample rate and the line pitch employed by the capture hardware respectively.

In one embodiment, the common decoder further includes a third function for the capture driver to confirm the presence of the common decoder, a fourth function for the capture driver to establish a mechanism for the common decoder to instruct the capture driver/hardware to capture certain scan lines in a vertical blank interval, a fifth function for the capture driver to inform the common decoder the channel being captured by the capture driver/hardware, and a sixth function for the capture driver to request the common decoder to decode a field.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
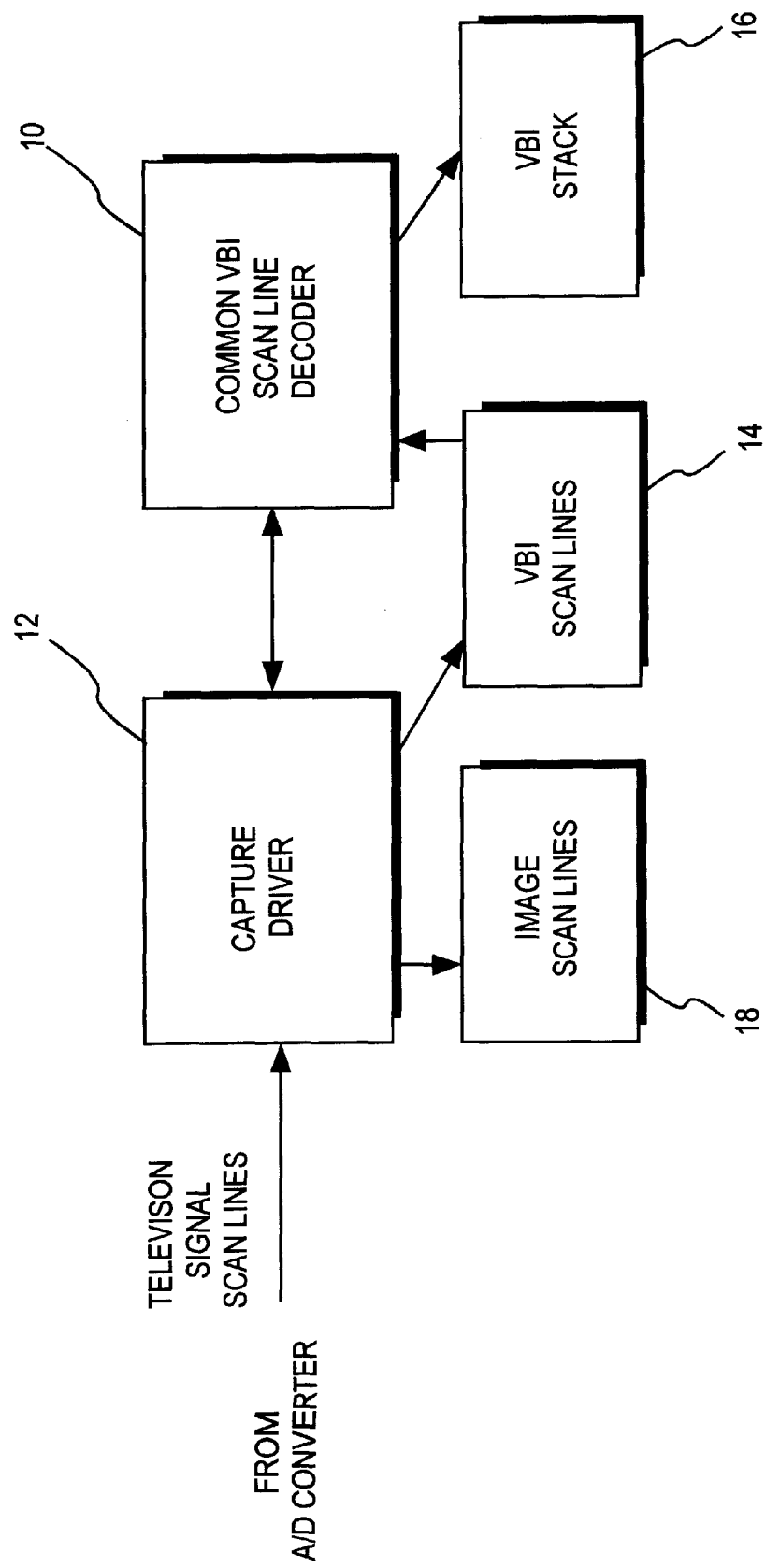
FIG. 1 is a block diagram illustrating an overview of the present invention.

Referring now to FIG. 1, a block diagram illustrating an overview of the present invention. As shown, in accordance with the present invention, capture driver 12 associated with capture hardware (not shown) of a particular vendor for capturing television signals output[1] by an A/D converter (not shown), including closed captions and teletext scan lines broadcast in the vertical blank intervals of the television signals, invokes common VBI scan line decoder 10 of the present invention to decode captured VBI scan lines 14, thereby freeing the capture hardware vendor from having to provide its own decoding solution. As will be described in more details below, capture driver 12 describes at least the oversampling ratio and the line pitch employed by capture driver 12 and its associated capture driver to generate captured VBI scan lines 14. As will be readily apparent to those skilled in the art, based on the descriptions to follow, common VBI scan line decoder 10 is suitable for servicing capture drivers associated with capture hardware from multiple vendors.

[1]Typically in an 8-bit format.

Still referring to FIG. 1, for the illustrated embodiment, capture driver 12 further captures image scan lines 18 from television signals output by the A/D converter. The manner in which image scan lines 18 are stored is dependent on the requirements of the video services employed to render television images from captured image scan lines 18. Any one of a number of video services known in the art may be used. Typically, the video service employed is a function of the software environment. Except for the manner capture driver 12 cooperates with common VBI scan line decoder 10, capture driver 12 is intended to represent a broad category of capture drivers known in the art. Accordingly, except for the manner capture driver 12 cooperates with common VBI scan line decoder 10, capture driver 12 will not be otherwise further described.

For the illustrated embodiment, common VBI scan line decoder 10 stores decoded VBI scan lines into VBI stack 16 for a data stream interpret to interpreter the decoded VBI scan lines for an application. Implementation of VBI stack 16 is well within the ability of those skilled in the art, accordingly, it will not be further described either.

Figure 2:
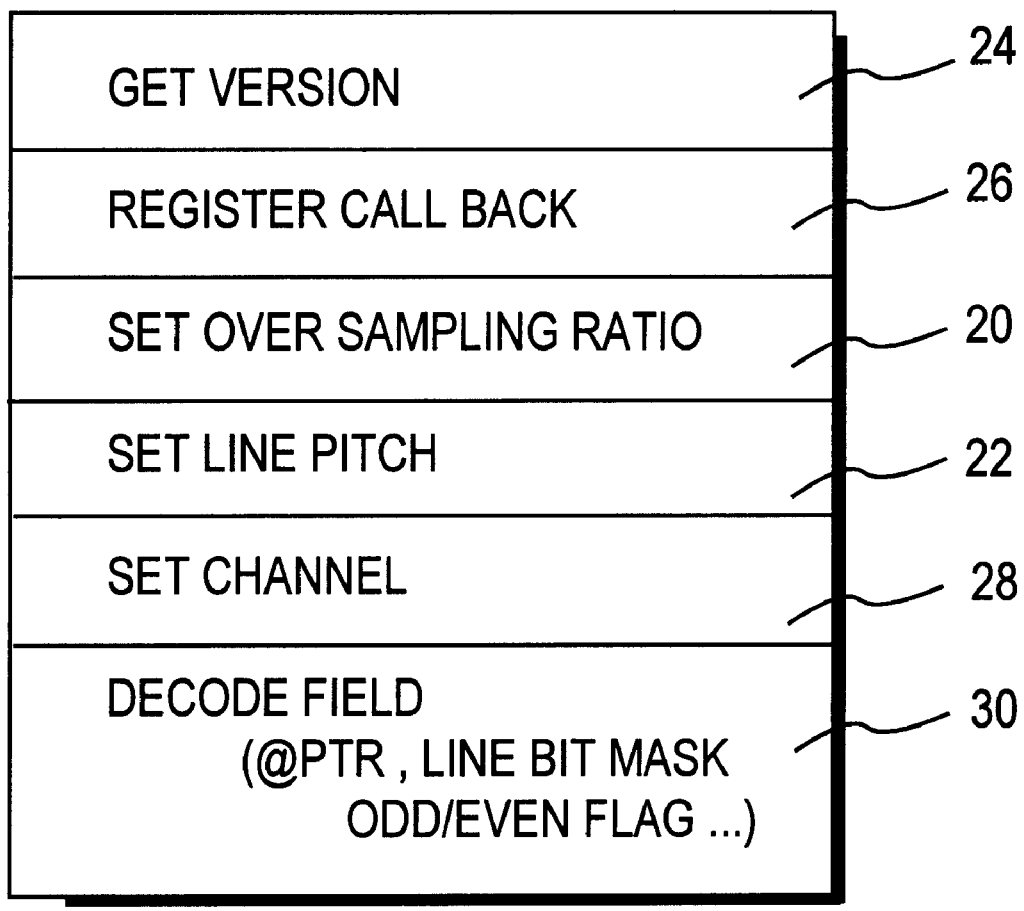
FIG. 2 is a block diagram illustrating one embodiment of the common VBI scan line decoder of the present invention.

FIG. 2 illustrates one embodiment of common VBI scan line decoder 10 (hereinafter simply common decoder). As shown, for the illustrated embodiment common decoder 10 includes first function 20 and second function 22 for capture driver 12 to inform common decoder 10 of the oversampling ratio and the line pitch employed by capture driver 12 and its associated capture hardware to capture VBI scan lines 14.

The oversampling ratio specifies the sampling ratio of capture hardware's A/D frequency to the scan line data bit frequency. For example, if capture hardware's A/D frequency is 28.636 Mhz, and the data bit frequency is in accordance with North American Broadcasting Television Specification (NABTS) for teletext[2], i.e. 5.7272 Mhz, the oversampling ratio is 5. Generally, the oversampling ratio remains constant throughput the course of decoding many fields. However, it may be changed between fields, if there is a need to do so. It is to be appreciated that although the present invention is discussed as informing the common decoder of the oversampling ratio, other conventional methods of indicating the sample rate can also be used within the spirit and scope of the present invention.

[2]See Joint EIA/CVCC Receommended Practice for Teletext: North American Basic Teletext Specification (NABTS), EIA-516, May 1988.

For the illustrated embodiment, the oversampling ratios supported are 3.5 to 6.0. The format of the oversampling ratio is a combined integer and remainder values, with the 8 most significant bits of a 32-bit value specifying the oversample integer, and the 24 least significant bits of the 32-bit value specifying the oversample remainder.

The line pitch specifies the spacing in memory between the beginnings of successive captured scan lines, which may be greater than the actual length of a captured scan line. However, for the illustrated embodiment, the spacing is constant, i.e. equally spaced. One or more contiguous captured scan lines form a field. (Note that not all scan lines in a transmitted VBI have to be captured. In other words, some of the transmitted VBI scan lines can be skipped by the capture hardware.)

Continuing to refer to FIG. 2, common decoder 10 further includes third function 24 and fourth function 26 for capture driver 12 to verify the presence of common decoder 10, and to establish a mechanism for common decoder 10 to instruct capture driver 12 to capture certain VBI scan lines. For the illustrated embodiment, third function 24 is a "Get Version" function, and fourth function 26 is a "register callback" function for capture driver 12 to register a callback function for common decoder 10 to call capture driver 12 to instruct capture driver 12 to start capturing certain VBI scan lines. In an alternate embodiment, in lieu of registering a callback function, capture driver 12 uses function 26 to poll common decoder 10 whether it is time for capture driver 12 to capture scan lines. As will be appreciated by those skilled in the art, capturing VBI scan lines only when it is necessary to do so reduces CPU cycle consumption, and improves overall system efficiency.

Still referring to FIG. 2, common decoder 10 further includes fifth function 28 and sixth function 30 for capture driver 12 to inform common decoder 10 which channel is being captured by capture driver 12 and the associated capture hardware, and request common decoder 10 to decode a field. For the illustrated embodiment, when requesting common decoder 10 to decode a field, capture driver 12 informs common decoder 10 where in memory to find the field to be decoded, which scan lines were captured, and whether the field is an odd field or an even field. (Closed Caption data are located in odd fields.) For the illustrated embodiment, the memory location is conveyed in the form of an address pointer; the VBI scan lines captured is conveyed in the form of a bit mask, e.g. 0x00208000 standing for lines 15 and 21 (and no others) are captured[3]; the odd/even information conveyed in the form of a flag.

[3]Bits 15 and 21 of the 32-bit mask set to 1.

Figure 4:
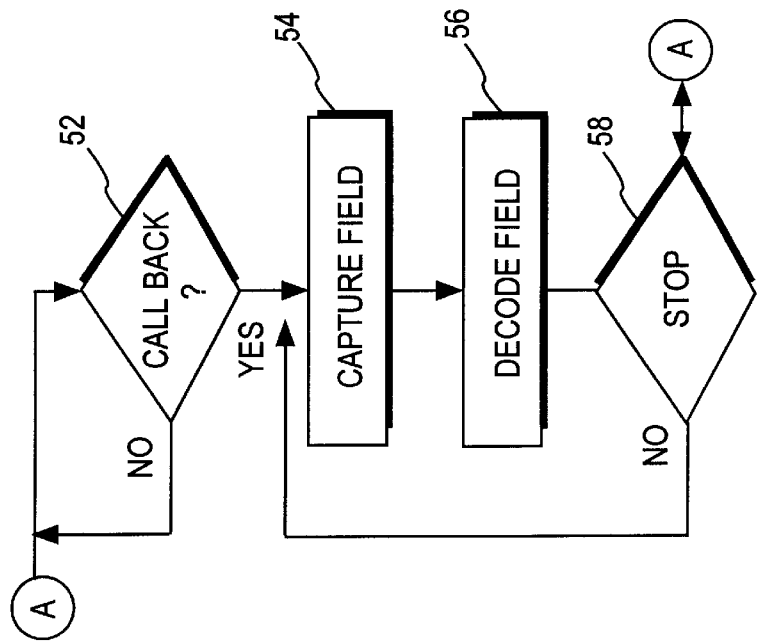
FIGS. 3-4 are flow diagrams illustrating one embodiment of the operational steps of a sample capture driver associated with a capture hardware, invoking the services of the common decoder of the present invention.
Figure 3:
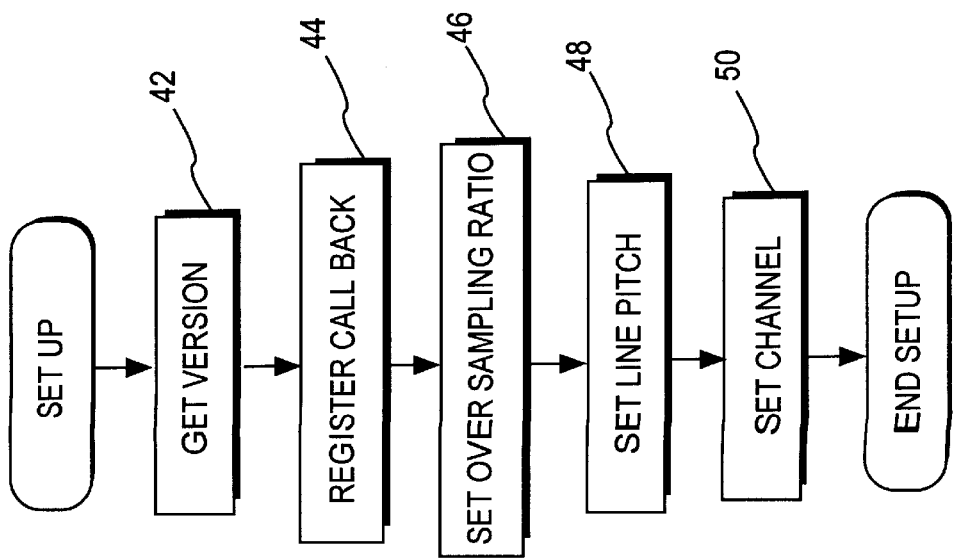

Before describing common decoder 10 further, we will first describe one embodiment of the operational flow of capture driver 12, referencing FIGS. 3-4. As shown in FIG. 3, for the illustrated embodiment, prior to invoking common decoder 10 to decode a field, capture driver 12 first invokes the "Get Version" function 24 to verify the presence of common decoder 10, step 42. Upon confirming the presence of common decoder 10, capture driver 12 invokes the "register" function 26 to register a callback function with common decoder 10 for common decoder 10 to instruct capture driver 12 to capture VBI scan lines, when it is time to do so, step 44. As discussed earlier, in an alternate embodiment, capture driver 12 may simply poll common decoder 10 from time to time, as opposed to registering a callback function. Next, capture driver 12 invokes the "set" functions 20, 22, and 28 to inform common decoder 10 of the oversampling ratio and the line pitch being employed, as well as the channel being captured, steps 46–50.

As shown in FIG. 4, for the illustrated embodiment, upon completing the above described set up steps, capture driver 12 waits for capture instructions from common decoder 10, step 52. Once received, capture driver 12 through capture hardware captures the VBI scan lines instructed, step 54. Upon capturing the requested VBI scan lines, capture driver 12 invokes the "decode" function 30 to request common decoder 10 to decode the field containing the captured VBI scan lines, step 56. If capture driver 12 has not been told to stop, it repeats steps 54–56 field after field until it has been told to stop. At such time, capture driver 12 returns to step 52.

Figure 6:
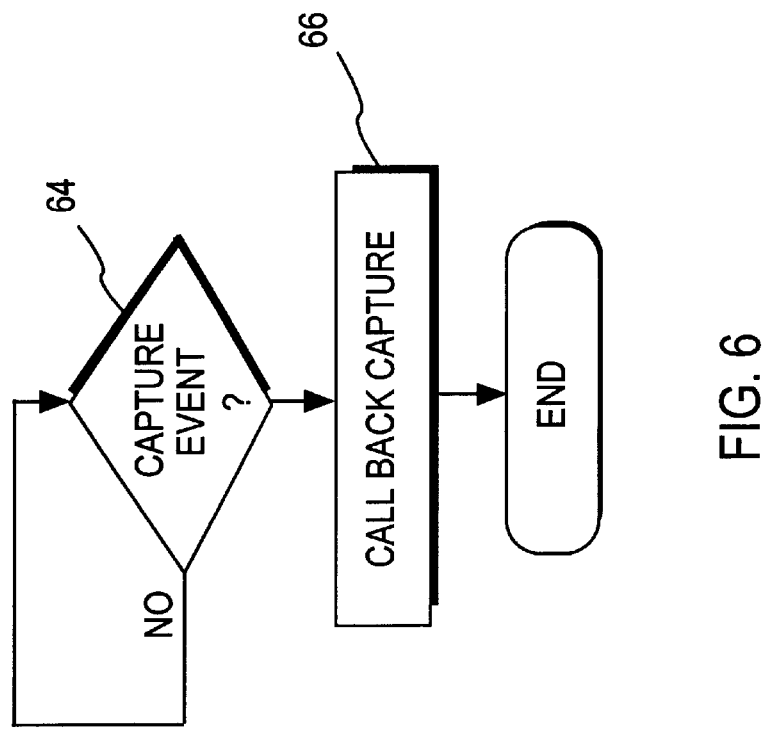
FIGS. 5-6 are flow diagrams illustrating one embodiment of the operational steps of the common decoder of the present invention.
Figure 5:
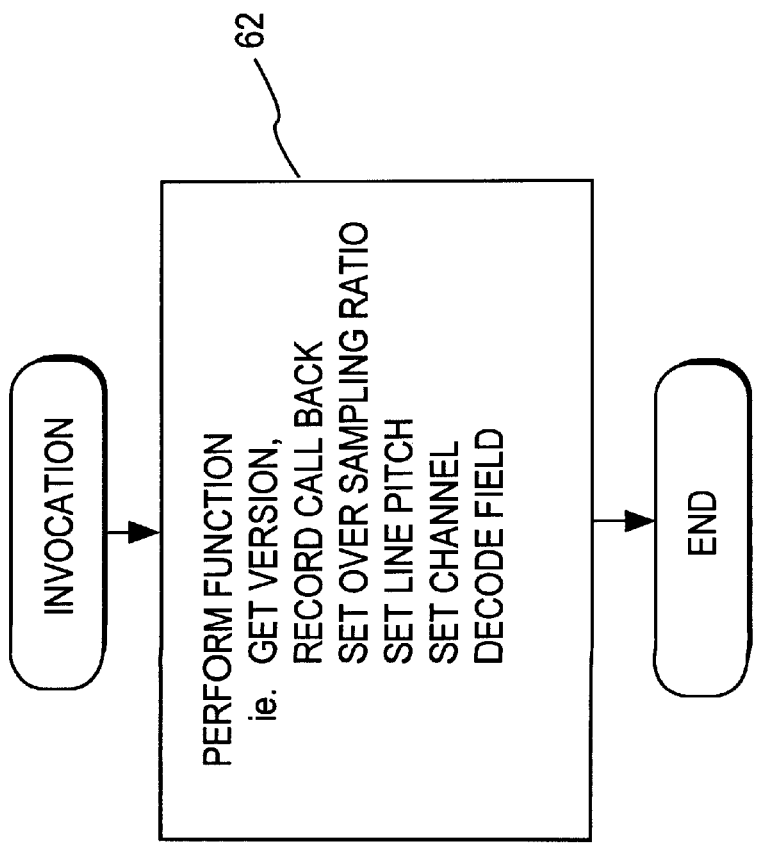

We now continue to describe common decoder 10, referencing FIGS. 5-6, wherein one embodiment of the operational flow of common decoder 10 is illustrated. As shown in FIG. 5, for the illustrated embodiment, in response to each function invocation, common decoder 10 performs the requested function. For the illustrated embodiment, upon invocation, "Get Version" function 24 returns a major and a minor version number. For "Register" function 26, upon invocation, it returns a line bit mask if scan line data are desired at the time, otherwise a null indicator. For "Set Oversampling Ratio" function 20, upon invocation, function 20 verifies whether the specified ratio is acceptable. For the illustrated embodiment, acceptability simply means compatibility. Function 20 also determines the oversampling ratio for Closed Caption. For example, if the oversampling ratio specified is 5.0, and the scan line's frequency is accordance with NABTS for teletext, function 20 will internally determine the oversampling ratio for Closed Caption to be 56.87 (5.0×11.37, since NABTS teletext data rate is 11.37 times the Closed Caption data rate of 0.5035 Mhz). If the ratio is acceptable, an "OK" status is returned, otherwise, an error status is returned. Similarly, for "Set Line Pitch" function 22, upon invocation, function 22 verifies whether the specified line pitch is acceptable. For the illustrated embodiment, acceptability means the line pitch set is greater than the actual line size of a captured scan line. If the line pitch is acceptable, an "OK" status is returned, otherwise, an error status is returned.

For "Set Channel" function 28, upon invocation, function 28 resets various internal operational parameters, for the illustrated embodiment, including anti-ghosting support as well as performance and signal quality monitoring statistics. Anti-ghosting support may include the improved techniques disclosed in co-pending U.S. Patent Applications, serial numbers, <insert two serial numbers>, entitled A Mechanism for Adaptive Selection of Anti-Ghosting Filtering, and A Self-Correcting Anti-Ghosting Process, invented by the inventor of the present application, and filed contemporaneously with the present application. If all resetting operations are successfully performed, "Set Channel" function 28 returns an "OK" status, otherwise an error status. For "Decode Field" function 30, upon invocation, function 30 decodes the requested field, and stores the decoded data in VBI stack 16 as described earlier. For the illustrated embodiment, function 30 includes the channel identification in all stored data. If the decode operation is performed successfully, an "OK" status is returned, otherwise an error value is returned. In either case, a bit mask denoting scan lines to be captured in the next field may also be returned. Decoding operation may include the improved run-in clock recovery technique disclosed in copending US Patent Application, S/N<insert serial number>, entitled Noise Tolerant Run-In Clock Recovery Method and Apparatus, invented by the inventor of the present application, and filed contemporaneously with the present application.

As shown in FIG. 6, in addition to the above described processing performed in response to the invocation of functions 20–30, during operation, common decoder 10 monitors for capture events, step 64. In response to the detection of a capture event, common decoder 10 calls capture driver 12 and instructs capture driver 12 to capture the appropriate VBI scan lines, step 66. Capture events include status changes by a client application, e.g. the client application asking for a new type of data, or common decoder 10 concluding on its own that certain scan lines no longer contain useful data.

Figure 7:
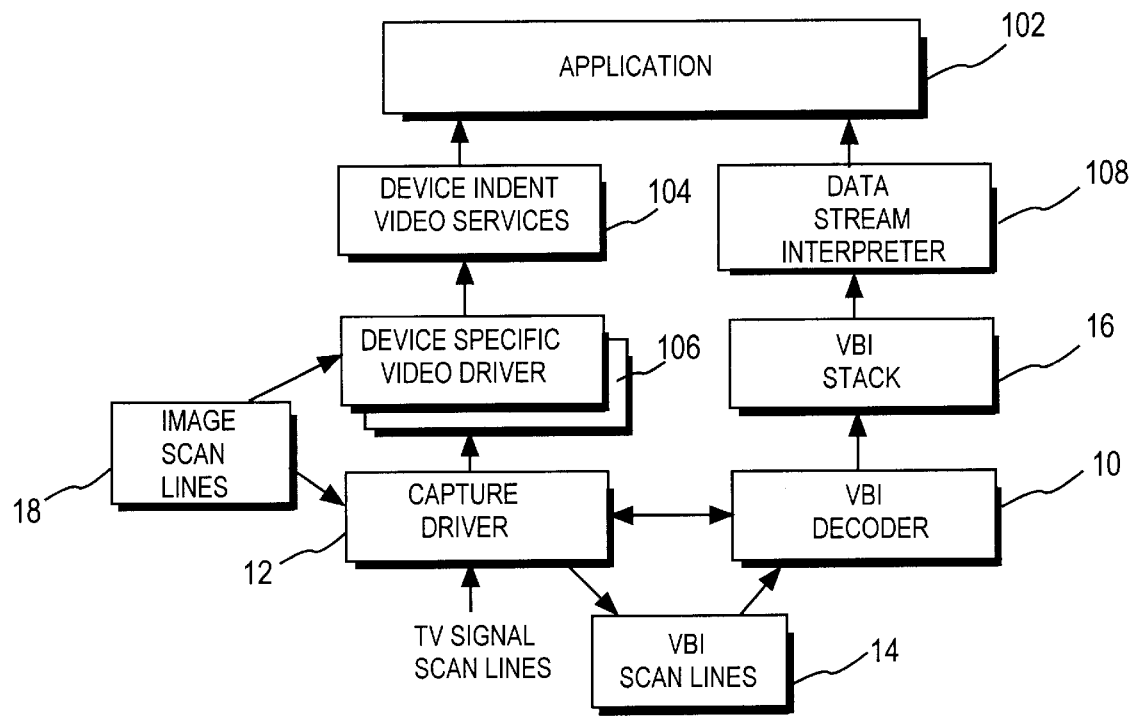
FIG. 7 is a block diagram illustrating one embodiment of a software environment suitable for practicing the present invention.

Referring now to FIG. 7, wherein a block diagram illustrating one embodiment of a software environment suitable for practicing the present invention is shown. As shown, for the illustrated embodiment, VBI decoder 10, capture driver 12, image scan lines 14, VBI scan lines 16, and VBI stack 16 cooperate with each other as described earlier. Additionally, image scan lines 14 are processed by device dependent video drivers 106, e.g. VfW drivers that implement Microsoft DirectX™ video support, which in turn provides the processed data to a device independent video service 104, e.g. Microsoft Video for Windows. The device independent video service 104 then generates the television images for application 102. With respect to the decoded scan lines, e.g. teletext or closed captions), data stream interpreter 108 interprets the decoded VBI scan lines for application 102.

Figure 8:
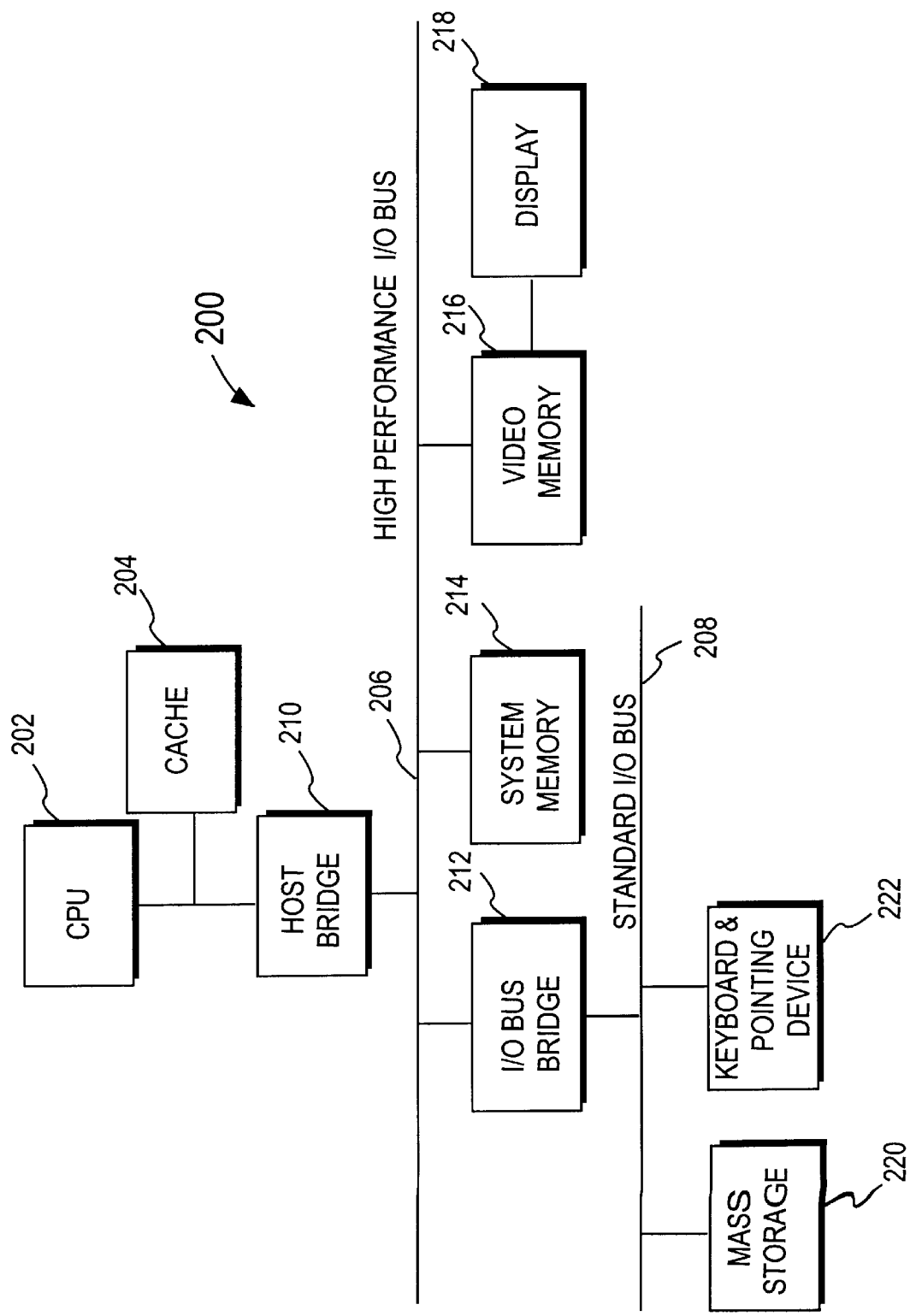
FIG. 8 is a block diagram illustrating one embodiment of a hardware system suitable for programming with the software environment of FIG. 7.

FIG. 8 illustrates one embodiment of a hardware system suitable for programming with the software elements of FIG. 7. As shown, for the illustrated embodiment, hardware system 200 includes CPU 202 and cache memory 204 coupled to each other as illustrated. Additionally, hardware system 200 includes high performance I/O bus 206 and standard I/O bus 208. Host bridge 210 couples CPU 202 to high performance I/O bus 206, whereas I/O bus bridge 212 couples the two buses 206–208 to each other. Coupled to bus 206 are system memory 214 and video memory 216. In turn, display device 218 is coupled to video memory 216. Coupled to bus 208 is mass storage 220 and keyboard and pointing device 222.

These elements 202–222 perform their conventional functions known in the art. In particular, mass storage 220 is used to provide permanent storage for the programming instructions implementing the above described functions, whereas system memory 214 is used to provide temporary storage for the programming instructions when executed by CPU 202. Mass storage 220 may be provided with the programming instructions by loading the programming instructions from a distribution storage medium (not shown), or by downloading the programming distributions from a server (not shown) coupled to hardware system 200 via a network/communication interface (not shown). Collectively, these elements are intended to represent a broad category of hardware systems, including but not limited to general purpose computer systems based on the Pentium™ processor, manufactured by Intel Corp. of Santa Clara, Calif., assignee of the present invention.

Thus, a method and apparatus for common VBI scan line decoding has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An apparatus comprising:
   an execution unit for executing programming instructions;
   a storage medium coupled to the execution unit having stored therein a plurality of programming instructions to be executed by the execution unit, the programming instructions, when executed, implementing a common vertical blanking interval (VBI) scan line decoder including at least one function for a capture driver to call the VBI scan line decoder, and specify to the decoder a sample rate indication and a line pitch employed by the capture driver to capture the VBI scan lines.

2. The apparatus as set forth in claim 1, wherein the VBI scan lines include teletext scan lines.

3. The apparatus as set forth in claim 1, wherein the specified sample rate indication is an oversampling employed by the capture driver to capture VBI scan lines.

4. The apparatus as set forth in claim 1, wherein the VBI scan lines include closed captions.

5. The apparatus as set forth in claim 1, wherein the at least one function further validates the specified sample rate indication and the specified line pitch.

6. The apparatus as set forth in claim 5, wherein the at least one function further determines an oversampling ratio for closed captions.

7. The apparatus as set forth in claim 1, wherein the at least one function further confirms for the capture driver the common decoder's presence.

8. The apparatus as set forth in claim 1, wherein the at least one function further registers for the capture driver a callback function with the common VBI scan line decoder for the common VBI scan line decoder to call the capture driver and instruct the capture driver to capture certain VBI scan lines.

9. The apparatus as set forth in claim 8, wherein the at least one function further returns a successful registration indicator, and optionally a bit mask denoting the VBI scan lines to be captured.

10. The apparatus as set forth in claim 1, wherein the at least one function is also for the capture driver to poll the common VBI scan line decoder for instructions to capture certain VBI scan lines.

11. The apparatus as set forth in claim 10, wherein in response to a poll, the at least one function returns optionally a bit mask denoting the VBI scan lines to be captured.

12. The apparatus as set forth in claim 1, wherein the at least one function is also for the capture driver to specify a channel for the common VBI scan line decoder identifying a channel whose VBI scan lines are being captured.

13. The apparatus as set forth in claim 12, wherein in response to a request to specify a channel, the at least one function resets one or more internal operational parameters.

14. The apparatus as set forth in claim 13, wherein the one or more internal operational parameters reset include anti-ghosting parameters.

15. The apparatus as set forth in claim 13, wherein the one or more internal operational parameters reset include performance and video quality monitoring statistics.

16. The apparatus as set forth in claim 1, wherein the at least one function is also for the capture driver to request the common VBI scan line decoder to decode a field.

17. The apparatus as set forth in claim 16, wherein in response to a request to decode a field, the common VBI scan line decoder decodes the field, and optionally returns a bit mask denoting additional VBI scan lines to be captured.

18. A machine implemented method for decoding VBI scan lines captured by a capture driver, the method comprising the steps of:
   a) receiving a function call from the capture driver by a VBI scan line decoder, specifying to the VBI scan line decoder a sample rate employed by the capture driver to capture the VBI scan lines; and
   b) in response, validating the received sample rate specification for the VBI scan lines by the VBI scan line decoder.

19. The method as set forth in claim 18, wherein the sample rate specification is an oversampling ratio employed by the capture driver to capture the VBI scan lines.

20. The method as set forth in claim 18, wherein the VBI scan lines include teletext scan lines.

21. The method as set forth in claim 18, wherein the VBI scan lines include closed caption scan lines.

22. The method as set forth in claim 18, wherein step (b) further includes determining by the VBI scan line decoder, an oversampling ratio for closed caption based on the specified sample rate for the VBI scan lines.

23. The method as set forth in claim 18, wherein the method further comprises the steps of:
   c) receiving by the VBI scan line decoder, a line pitch specification for the VBI scan lines from the capture driver; and
   d) in response, validating by the VBI scan line decoder, the line pitch specified.

24. The method as set forth in claim 23, wherein the method further includes the steps of:
   c) receiving by the VBI scan line decoder, a confirmation request from the capture driver; and
   d) in response, confirming by the VBI scan decoder of its presence.

25. The method as set forth in claim 18, wherein the method further includes the steps of:
   c) receiving by the VBI scan line decoder, a callback function registration from the capture driver to register a callback function to call the capture driver and provide the capture driver with VBI scan line capturing instructions; and
   d) in response, registering by the VBI scan line decoder, the callback function, and optionally returning a value denoting certain VBI scan lines are to be captured.

26. The method as set forth in claim 18, wherein the method further includes the steps of:
   c) polling the VBI scan line decoder by the capture driver for VBI scan line capture instructions; and
   d) in response, optionally returning by the VBI scan line decoder a value denoting certain scan lines are to be captured.

27. The method as set forth in claim 18, wherein the method further includes the steps of:
   c) receiving by the VBI scan line decoder a channel specification from the capture driver specifying a channel whose VBI scan lines are currently being captured; and
   d) in response, resetting by the VBI scan line decoder, one or more internal operational parameters.

28. The method as set forth in claim 18, wherein the method further includes the steps of:
   c) receiving by the VBI scan line decoder a request from the capture driver to decode a field; and
   d) decoding by the VBI scan line decoder, the field as requested, and optionally returning by the VBI scan line decoder, a bit mask denoting additional VBI scan lines to be captured.

29. A storage medium having stored therein a plurality of programming instructions to be loaded and executed by an execution unit, the programming instructions, when executed, implementing a common vertical blanking interval (VBI) scan line decoder having at least one function call for a capture driver to call the VBI scan line decoder, and specify for the decoder a sample rate indication and a line pitch employed by the capture driver to capture VBI scan lines.

30. The storage medium as set forth in claim 29, wherein the at least one function call is also for the capture driver to call the decoder to confirm the decoder's presence.

31. The storage medium as set forth in claim 29, wherein the at least one function call is also for the capture driver to call the common VBI scan line decoder to register a callback function with the common VBI scan line decoder for the common VBI scan line decoder to call back, and provide VBI capture instructions to the capture driver.

32. The storage medium as set forth in claim 29, wherein the at least one function call is also for the capture driver to poll the common VBI scan line decoder for VBI capture instructions.

33. The storage medium as set forth in claim 29, wherein the at least one function call is also for the capture driver to call the common VBI scan line decoder to specify a channel whose VBI scan lines are being captured by the capture driver.

34. The storage medium as set forth in claim 29, wherein the at least one function call is also for the capture driver to call the common VBI scan line decoder to decode a field of a captured VBI scan line.

35. In a system, an automated method for decoding VBI scan lines, the method comprising the steps of:
   a) a capture driver calling a common VBI scan line decoder to specify a sample rate indicator employed by the capture driver to capture the VBI scan lines;
   b) in response, the common VBI scan line decoder, validating the specified sample rate indicator;

c) the capture driver calling the common VBI scan line decoder to specify a line pitch employed by the capture driver to capture the VBI scan lines;

d) in response, the common VBI scan line decoder, validating the specified line pitch.

36. The automated method as set forth in claim 35, wherein the specified sample rate indicator is an oversampling ratio used by the capture driver to capture VBI scan lines.

37. The automated method as set forth in claim 35, wherein step (a) further comprises the capture driver confirming the common VBI decoder's presence prior to calling the common VBI decoder to specify the sample rate indicator.

38. The automated method as set forth in claim 35, wherein step (a) further comprises the capture driver registering with the common VBI scan line decoder a callback function for the common VBI scan line decoder to call the capture driver to provide VBI scan line capturing instructions.

39. The automated method as set forth in claim 35, wherein step (a) further comprises the capture driver polling the common VBI scan line decoder for VBI scan line capturing instructions.

40. The automated method as set forth in claim 35, wherein step (b) further comprises determining an oversampling ratio for closed caption based on the sample rate indicator specified.

41. The automated method as set forth in claim 35, wherein the method further comprises step (e) the capture driver informing the common VBI scan line decoder of a channel whose VBI scan lines are being captured.

42. The automated method as set forth in claim 35, wherein the method further comprises step (e) the capture driver requesting the common VBI scan line decoder to decode a field of a captured VBI scan line.

\* \* \* \* \*